United States Patent

[11] 3,618,020

[72] Inventor Bernhard Dollman Parker
London, England
[21] Appl. No. 26,976
[22] Filed Apr. 9, 1970
[45] Patented Nov. 2, 1971
[73] Assignee Decca Limited
London, England
[32] Priority Apr. 9, 1969
[33] Great Britain
[31] 18183/69

[54] DATA TRANSMISSION SYSTEMS
17 Claims, 4 Drawing Figs.

[52] U.S. Cl. 340/147 R, 340/147 C, 340/147 PC, 340/171 A
[51] Int. Cl. H04q 9/00
[50] Field of Search 340/147 C, 167, 171 A; 325/40, 143; 178/69

[56] References Cited
UNITED STATES PATENTS

| | | | |
|---|---|---|---|
| 2,861,257 | 11/1958 | Weintraub | 325/143 UX |
| 3,133,280 | 5/1964 | Crater | 340/167 X |
| 3,437,755 | 4/1969 | Brown | 340/167 |

*Primary Examiner*—Donald J. Yusko
*Attorney*—Mawhinney & Mawhinney

ABSTRACT: A data transmission system for binary form data has four transmission channels, even bits being transmitted on a first pair of channels and odd bits on a second pair. Between blocks (typically corresponding to alphanumeric characters) interblock indicators are transmitted alternately of different distinctive form, each interblock indicator being a transmission on typically, two channels selected as a combination which cannot occur during the blocks. The receiver has interblock indicator detectors to indicate an error, if after each character, a correct interblock indicator is not received.

DATA TRANSMISSION SYSTEMS

BACKGROUND OF THE INVENTION

1. Field of the Invention

This invention relates to systems for the transmission of data in the form of blocks of binary information.

For many purposes, it is convenient to make use of short blocks of binary information, each block representing a single character, instruction or symbol. For example the I.S.O. Standard International Code which is used by airlines makes use of codes with eight bits for each character. Conventional teleprinter codes likewise make use of characters defined by typically five or seven bits for each character. It is one of the objects of the present invention to provide a transmission system for transmitting information of this nature and which permits of automatic checking to be effected to ensure that, at a receiving station, each character is completely received with a clear distinction between the information relating to successive characters. This is particularly important if the transmission is at a variable bit rate or a variable character rate. This checking for errors is particularly important if the transmission is over a poor quality transmission link as is the case for example with long-distance radio links where gaps may occur in reception due to ionospheric reflections, which gaps might be mistaken for gaps between digits, or where a digit may be repeated after a short time delay due to propagation over an indirect path. It would be possible to overcome these difficulties by using gaps between digits which are very much longer than would otherwise be required but in this case the time required for the transmission of information is longer than would otherwise be necessary.

2. Description of the Prior Art

The present invention makes use of a four channel transmission system such as described in the specification of British Pat. No. 860,830. In that specification there is described and claimed apparatus for the transmission of binary digital data in serial form comprising four transmission channels for the separate transmission of information, and means for separating and feeding the successive digits of incoming information into the four channels so that the odd digits, that is to say the first, third, fifth etc. digits have '1's fed into the first channel and '0's fed into the second channel, while even digit '1's are fed into the third channel and even digit '0's into the fourth channel. The four channels might typically be four tones forming subcarriers in a radio transmission system. It will be seen that with this form of transmission, a signal on the first or second channel must necessarily be followed by a signal on the third or fourth channel.

SUMMARY OF THE INVENTION

The present invention makes use of this type of transmission but further utilizes the transmission of a signal on the first channel and a signal on the second channel or a signal on the third channel and a signal on the fourth channel to provide an interblock indicator. The block is usually a character and this indicator forms an end of character or start of character indicator. It will be immediately apparent that more complex indicators may be used employing at least one of these pairs. Such a pair of signals however cannot occur during the transmission of the bits representing a character. It is preferred that the two signals forming this indicator are transmitted in succession; the sequence of reception of the two signals thus provides a further check on the correct reception of the indicator.

It is most convenient to use a constant number of digits for each block as this facilitates the automatic checking of the complete reception of each block. It will be immediately apparent that, if the start of a block indicator (this is usually the same indicator as also indicates the end of the preceding block) is formed by transmissions on the first and second channels, then the first bit of the block following this indicator should make use of either the third or fourth channels. Similarly if the indicator is formed by transmissions on the third and fourth channels, then the start of the next block should be by a transmission on the first or second channel. Likewise at the end of a block, if the last bit of the block is a transmission on the first or second channel, then the indicator should be a transmission on the third and on the fourth channel.

It is preferred to use an even number of bits in each block. Then, if the interblock indicator for the start of one block is represented by transmissions on the first and second channels, the interblock indicator for the start of the next block will have to be transmissions on the third and fourth channels. Hence two different indicators are employed which identify alternate blocks thereby further facilitating checking at the reception.

If it is required to have an odd member of bits in each block, then the interblock indicator after one block may be an odd 1 followed by an odd 0 and the interblock indicator after the next block a 0 followed by an odd 1.

It will be seen that, by using this technique, it becomes readily possible to transmit data in the form of short blocks of binary information, each block representing a single character, instruction or symbol and to provide systematic error-checking means at the receiving station to check the correct reception of each block. Messages of any length may be transmitted, for example plain language messages using a teletype code, while still obtaining the advantages of the transmission system described in the aforementioned specification No. 860,830. By the arrangement of the present invention, it is possible to make a check on each character independently of any other character. Thus if one character is lost, e.g. through bad radio reception, the whole message is not lost.

Thus according to one aspect of the present invention a transmission system for transmission of binary digital data in blocks in serial form comprises four transmission channels for the separate transmission of information and means for separating and feeding the successive digits of the information to be transmitted into the four channels so that odd digits are fed into one or other of one pair of channels according as the digit is to be a '0' or '1' and even digits are fed into one or other of the other pair of channels according as to whether that digit is a '0' or '1' in combination with means for transmitting, between the end of one block of bits and the beginning of the next block of bit signals on two channels of either the first pair or the second pair to form an interblock indicator, the particular pair of channels used for the indicator being a pair not including the channel used for the last bit of the preceding block and the next succeeding block starting with a bit on one or other of a pair of channels not the same as used for the indicator immediately preceding this bit. In the simplest form, the indicator comprises transmissions on two channels only in succession.

At a receiving station for this transmission system, there may be provided means for receiving the signals on the four channels, a detector for detecting the interblock indicator which detector provides an output to initiate the feeding of the following bits into a register capable of receiving all the bits of a block, and means responsive to the reception of the next indicator transmission for feeding the information out from the register to an output line or lines. The information in the register represents one block, e.g. one character, and most conveniently it is staticized in the register in binary digital form, the signals from the various channels being fed into a single through appropriate switching circuits switching alternately from one pair of channels to the other pair of channels as each successive bit is received. The output information from the register may be precessed using conventional techniques, for example it may be fed to a teletype machine or master store or computer or recorded on tape, or, depending on the nature of the information, used for control purposes.

As previously explained, if the indicator comprises a single pair or bits and each block has an even number of bits, the indicators between successive blocks have to be on different pairs of channels. Conveniently in such an arrangement, two registers are employed for alternate blocks together with two detectors for the two different indicators, the output of each detector being used firstly for opening a gate for feeding the information from the register in which the preceding block was staticized to the output line or lines and secondly for resetting to 0 the register for staticizing the digits of the next block.

The two registers with their associated circuits are, in effect, arranged in a ring so that the first block gets staticized in the first register, the second in the second register, the third in the first register and so on.

A checking logic system may be provided to check each register for completeness before information is read out from it. For each block, additional logic checking may be provided in the manner described in the specification of No. 860,830.

DESCRIPTION OF THE PREFERRED EMBODIMENT

Figure 1:
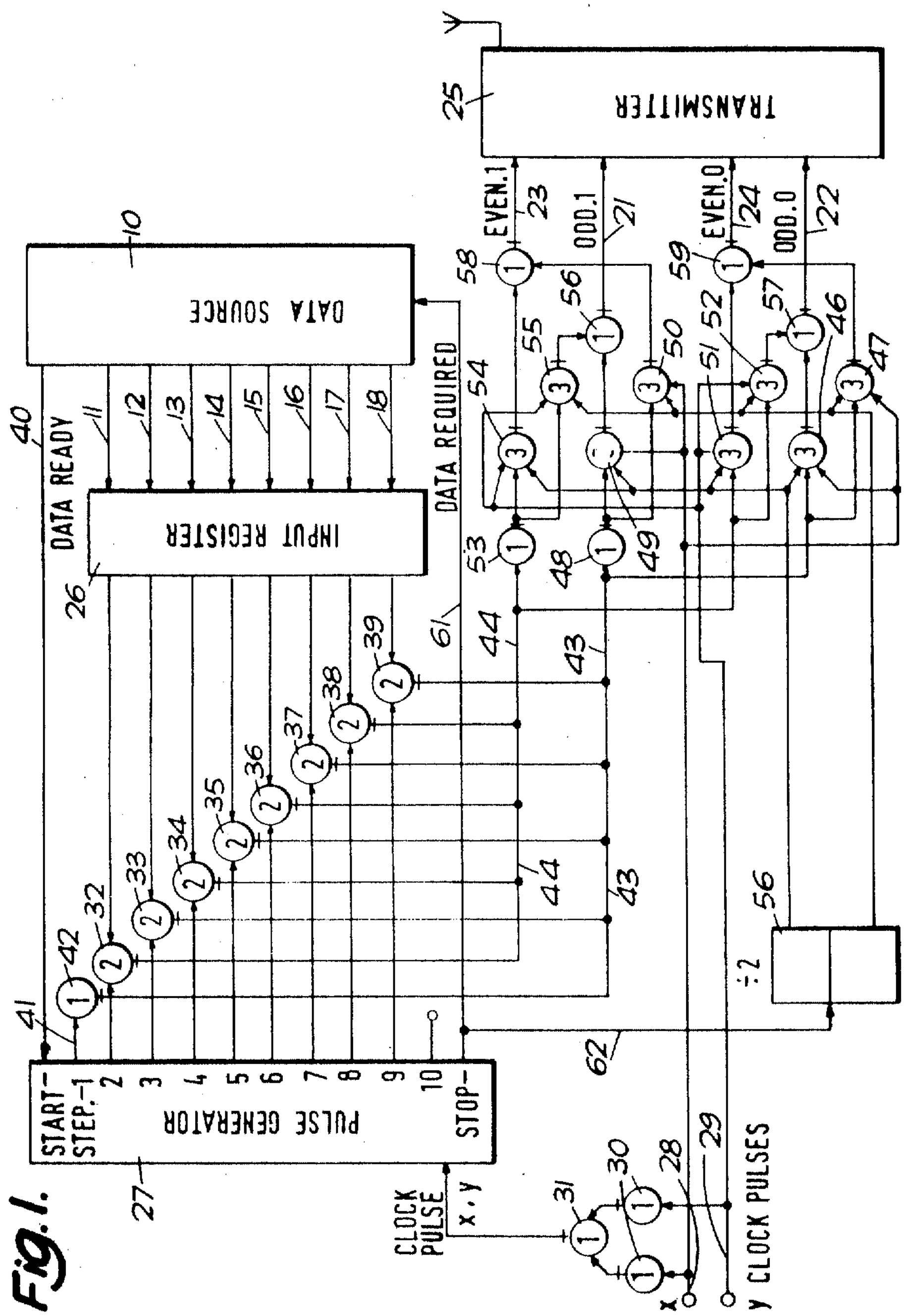
FIG. 1 is a diagram illustrating a transmitting station for transmitting input data from a data input terminal such as a teletype machine.

FIG. 1 illustrates diagrammatically transmission apparatus for transmitting data from a data source indicated diagrammatically at 10 which provides digital output signals on eight lines 11 to 18. Typically this data source might be a teletype machine. In the following description, each block of information is assumed to be a single character (e.g. an alphanumeric character) expressed as eight bits. As will be explained hereinafter, the apparatus of FIG. 1 converts the data received from this data source 10 into a series of sequential signals on four output lines 21, 22, 23, 24. The signals on these lines are of the form previously described in which the odd digits, that is to say the first, third, fifth, etc. digits have '1's fed into the line 21 and '0's fed into the line 22 while the even digits, that is the second, fourth, sixth, etc. have '1's fed into the line 23 and '0's fed into the line 24. The output information on the lines 21 to 24 is transmitted to a distant point for example by means of a radio transmitter indicated diagrammatically at 25.

The input information on lines 11 to 18 is fed in digital form into an input register 26 from which it is extracted in serial form via eight double-input gates 32 to 39. In FIGS. 1 and 3 all the gates are indicated by a circle with a numeral in it; this numeral indicates the number of positive inputs required to give a negative output. The gates 32 to 39 are thus two input NAND gates and they receive their second inputs in sequence from a pulse generator 27 fed with clock pulses which are derived from alternate pulses on two clock pulse input lines 28, 29 which are referred to respectively as the X and Y clock pulse lines. By means of two gates 30 (which may be considered as inverters) and a gate 31 (which may be considered as an exclusive OR gate with an inverter) both X and Y clock pulses are fed to the pulse generator 27, to synchronize the step sequence of the pulse outputs. The pulse sequencing is started by a start signal on an input line 40 and the first output pulse, on a line 41, is fed to a gate 42 (forming an inverter) leading to a first output line 43. To this output line 43 are connected the double-input gates 33, 35, 37, and 39. The double-input gates 32, 34, 36 and 38 are connected to a second output line 44. The line 43 is connected directly to two triple-input gates 46, 47 and is connected via an inverter 48 to two further triple-input gates 49, 50. The line 44 is connected directly to two triple-input gates 51, 52 and is connected via an inverter 53 to triple-input gates 54, 55. Four of these triple-input gates 46, 47, 49, 50 have a second input from the X clock pulse line 28 while the other four 51, 52, 54, 55, have a second input from the Y clock pulse line 29. The third input to the eight triple-input gate is derived from one or other output of a divide-by-two bistable 56 which is set in one or other of two conditions. In one condition it applies a signal to four triple-input gates 46, 49, 51, 54 while in the other condition it applies a signal to the other four triple-input gates 47, 50, 52, 55. It will readily be seen on consideration of the circuit that a zero output can be obtained, at any one time, only from one of the eight triple-input gates, this zero output occurring at one of the clock pulses. The particular triple-input gate depends on which clock pulse is present, the setting of the divide-by-two bistable 56 and the selection, by the pulse generator 27, of one or other of the input lines 43, 44. The eight triple-input gates 46, 47, 49, 50, 51, 52, 54, 55 are connected in pairs via gates 56, 57, 58, 59 (which may be considered as exclusive OR gates with inverters) to the four output lines 21-24.

The pulse generator 27 starts on a command from the data ready input on a line 40 from the data source 10 and scans the gates 41 and 36-39 in sequence so that the data information from the successive bits in the input register 26 is transferred alternately to the two lines 43, 44 and, depending on whether the input data in the register 26 is a 1 or 0, for information on line 43, an output is given on one of the two odd signal output lines 21, 22 while, depending on whether the signal on line 44 corresponds to a 1 or 0, a signal is given on one of other of the even output lines 23, 24. The first step in the scanning sequence does not have any input from the input register and, assuming it is on a Y clock pulse, provides say an even 1 output on 23. The particular output (i.e. whether it is on 21 or 23) will depend on the setting of the bistable 56, the operation of which will be described later. The first bit of the word (from the register 26) will be transmitted on the next clock pulse which comes from, in this case the X clock pulse line 28, and will therefore be transmitted as an odd 1 or 0. The successive bits of the character up to bit 9 will be transmitted alternately as even and odd signals. In this case the ninth bit will be transmitted as an even signal. At step 10 of the pulse generator, an odd 0 is generated (no connection to lines 43, 44 is necessary for this) and then on the next step a signal is applied to a data required line 61, which signal also forms a stop signal for the pulse generator 27 and a switching signal on line 62 for switching over the aforementioned divide-by-two bistable 56. The data required signal is fed to the input device 10 so that the next set of input information representing the next character to be transmitted is put in the input register 26. Since the bistable 56 is switched, on the next scanning sequence the first step from the pulse generator will now produce an odd 1 instead of an even 1 thereby producing a correct interblock mark between the two characters. It will be seen that the switching of the bistable 56 generates a hiccup in the odd-even sequence so that two successive signals are transmitted on odd output lines 21, 22 or on even lines 23, 24 to mark the end of the scanning sequence.

It will be noted that the interblock indicator is produced by one signal at the end of a scanning sequence and another at the beginning of the next scanning sequence. It is the normal practice to commence teleprinter messages with EEE. This allows the first character block to be corrupt and thus it is immaterial that there is no interblock marking before the first character in the sequence. Having transmitted the first character, the successive characters are transmitted with the correct interblock marks.

The information on the output lines 21-24 is applied to the radio transmitter 25 and is typically transmitted as modulation on four subcarriers.

Figure 2:
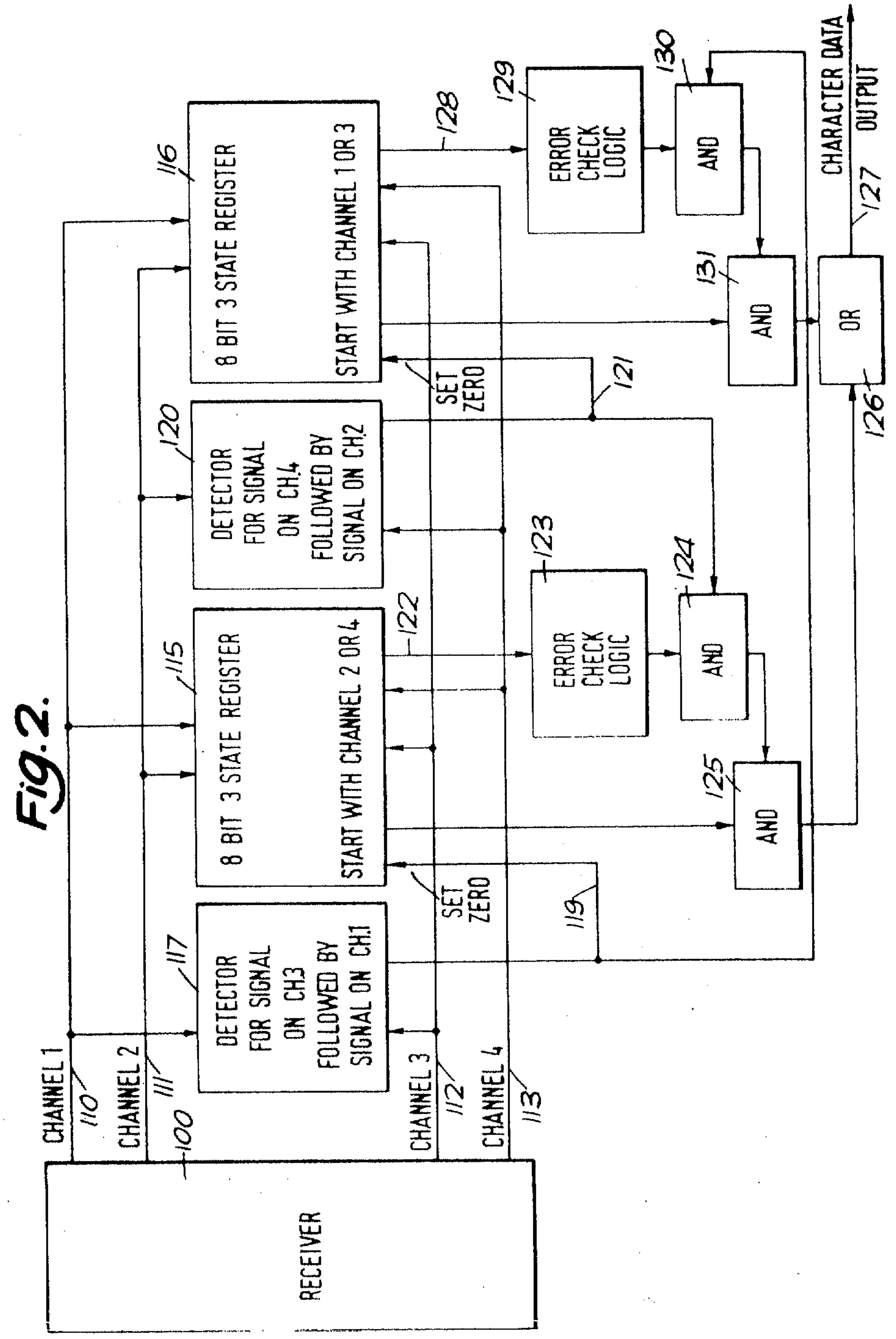
FIG. 2 is a diagram illustrating part of the equipment used in a receiving station for staticizing and feeding out received data.

At a receiving station, this information is received by a receiver which separates the four subcarriers to provide signals corresponding to those on the output lines at the transmitter. Referring to FIG. 2 there is shown part of the equipment used in a receiving station for staticizing and feeding out incoming data. The incoming data is received on a radio receiver shown diagrammatically at 100 which separates the four subcarriers and feeds the information on these subcarriers to four input lines 110, 111, 112, 113. The lines 111 and 113 will be referred to as the first pair of channels and the lines 110 and 112 as the second pair of channels. As has previously been explained, the digits of a character are transmitted using alternately one pair of channels and then the other pair of channels. For example, the odd digits might be transmitted with a '0' on the fourth channel and a '1' on the second channel while even digits would be transmitted as a '0' on the third channel and a '1' on the first channel. In the particular arrangement illustrated, each character has eight bits and one character starts with a digit on either the fourth or second channel while the other character starts with a digit on either the third or first channel. Thus, for example, the first and third channels are used for odd digits in one character and even digits in the next character.

Two eight-bit registers 115, 116 are provided these being used for alternate characters. Preferably these registers are three-state registers of the form described and claimed in the specification of British Pat. No. 892,272. A first detector 117 detects an interblock indicator which represents the start of an odd character and the end of an even character; this indicator is constituted by a signal on channel 3 followed by a signal on channel 1. The output of this detector is fed via a line 119 to set to 0 the register 115. A second detector 120 detects a second start of character indicator representing the start of an even character and the end of an odd character. This indicator comprises a signal on channel 4 followed by a signal on channel 2. The output of this second detector is fed via a line 121 to set to 0 the register 116. After a register has been set to 0, the incoming signals from the four channels are fed into the register by switching means so that alternate signals from the first pair of channels and the second pair of channels set the stages of the register in sequence so as to staticize the serially received information. This switching may be effected in the manner described in the aforementioned specifications; reference is made in particular to the specification No. 892,272 which describes and claims a three-state staticizer staticizing information available in serial form on four channels, alternate digits being received on first and second pairs of channels. When the end of the first character is reached, an output is available from the register 115 on a lead 122 which is supplied to an error-checking logic circuit 123 which checks the register for completeness and provides a first signal to an AND gate 124. A second signal to this AND gate is provided from the second detector 120 which detects the start of the even character and hence the end of the odd character. Opening of the AND gate 125 provides an opening signal for an AND gate 125 permitting the character information from the register 115 to be fed out serially or in parallel through an OR gate 126 to a data output line 127. Similarly the second register 116 is set to zero by a signal from the second detector 120 and is then filled with information representing the second character. This register requires, in this particular embodiment, to start with information from the first or third channel whereas the first register required the first bit to be from the second and fourth channels. At the end of the reception of the data representing the second character, a signal will be obtained from the second register on a line 128. This signal is fed to an error-checking logic circuit 129 which checks the register for completeness and provides an output to an AND gate 130. Reception of the next indicator, which is detected by the first detector 117, opens this AND gate 130 and provides a signal to a further AND gate 131 which permits the character information in the second register to be fed out in parallel or serially through the aforementioned OR gate 126 to the output line 127.

Figure 3A:
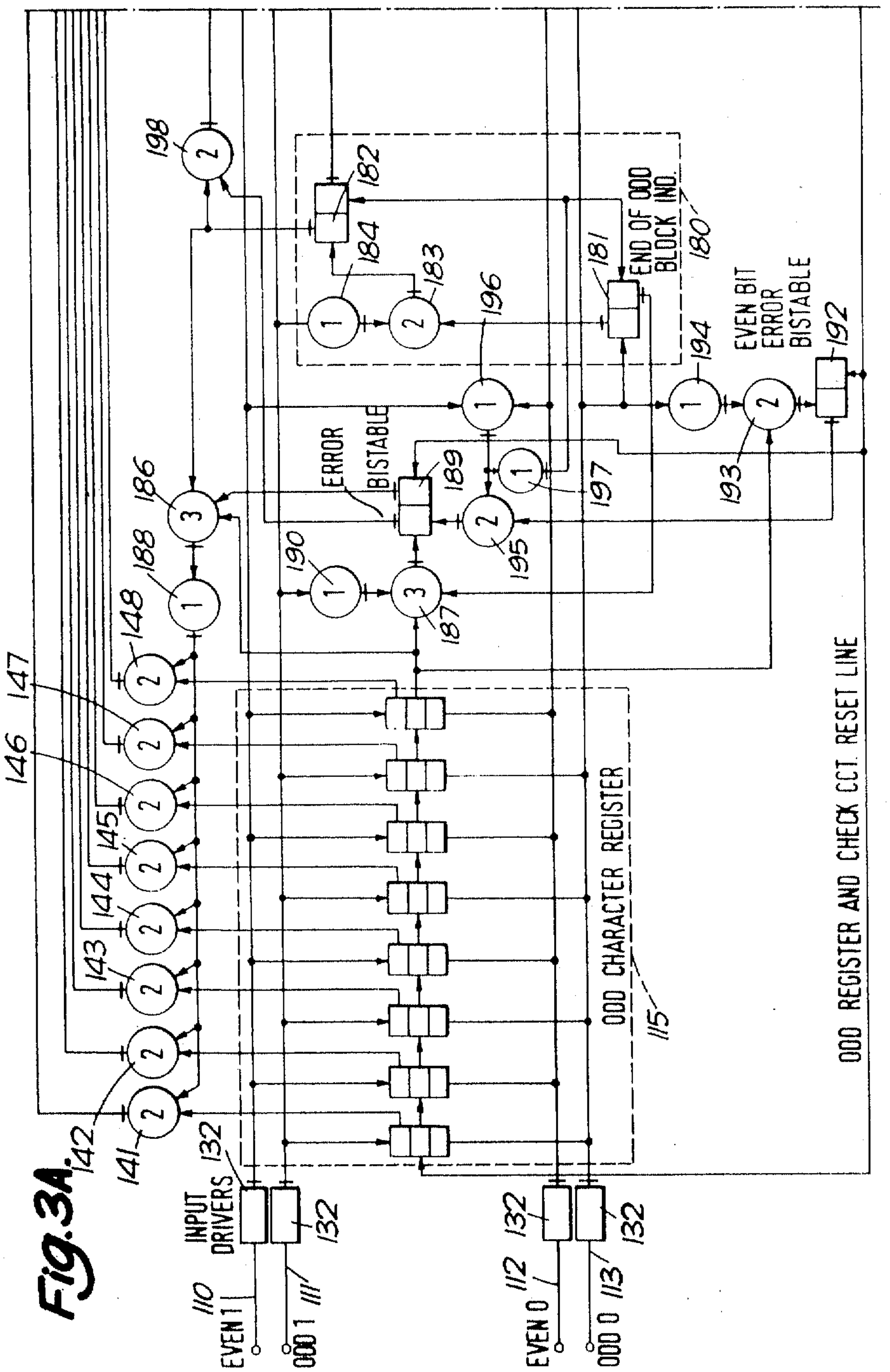
FIG. 3 (formed by FIGS. 3*a* and 3*b* together) illustrates in further detail part of the equipment in the receiving station.
Figure 3B:
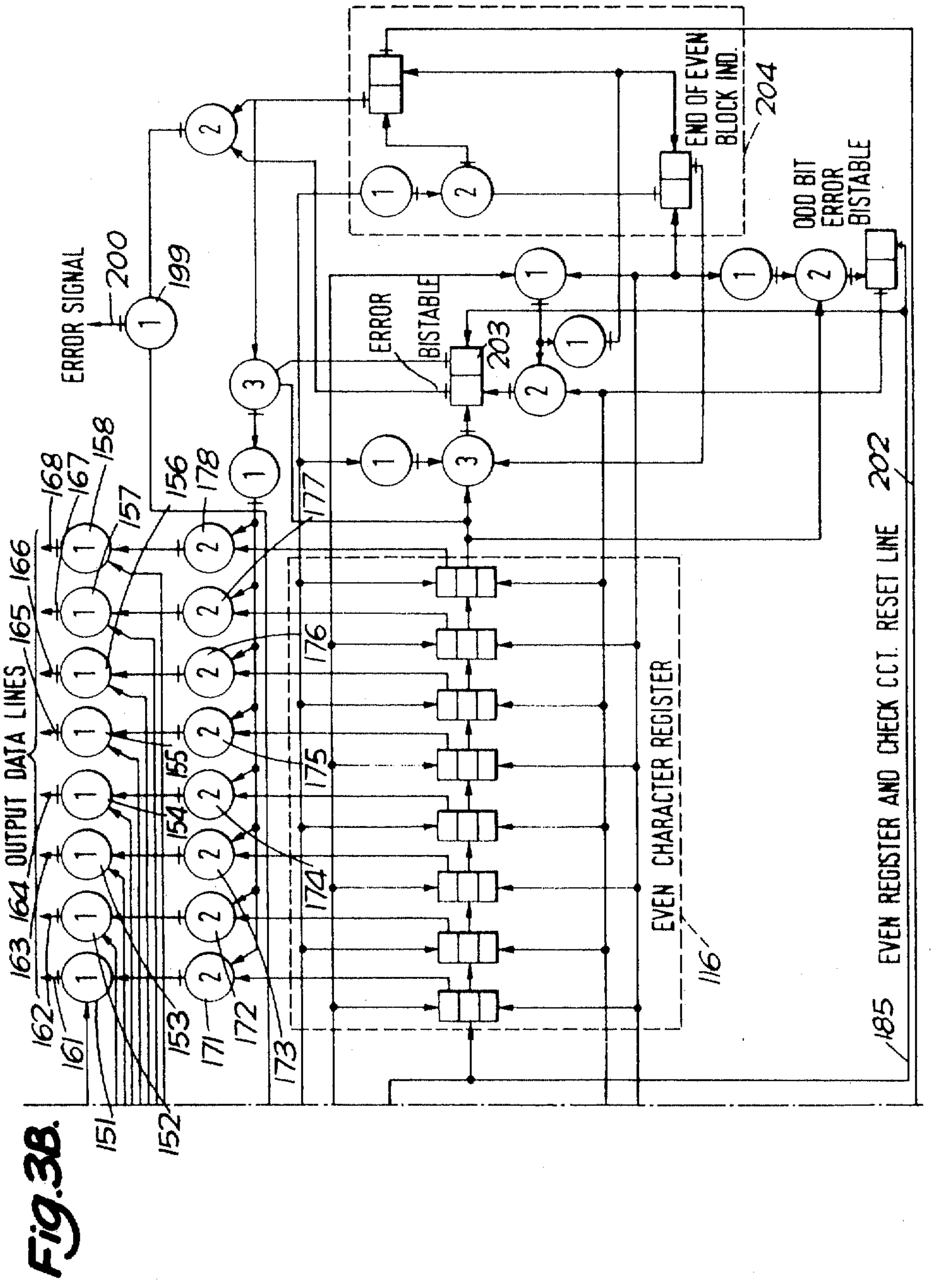

The receiver is shown in further detail in FIGS. 3a and 3b which together illustrate the registers detectors and associated logic circuit of FIG. 2. The same reference numerals are used to illustrated corresponding components and, in the following description, mention will only be made of further features illustrated in FIG. 3. Each of the registers 115, 116 is an eight bit three-state register for staticizing information available in serial form on four channels of the kind which is described in further detail in specification No. 892,272. The output from the odd digit register 115 is taken via eight double-input gates 141 to 148 (which may be considered as AND gates with inverters), which gates are opened at the appropriate time from the end of character logic to feed information to eight gates 151 to 158 (which may be considered as exclusive OR gates with inverters) leading to output lines 161 to 168. Similarly the even character register 116 feeds the information via eight gates 171 to 178 (which may be considered as double-input AND gates with inverters) and thence to the aforementioned eight gates 151 to 158.

The inputs lines 110–113 of FIG. 3 feed the registers and logic units via drivers 132 in the specific embodiment shown in FIG. 3.

The logic at the end of the odd character register 115 detects an odd 0 (on line 113) followed by an odd 1 (on line 111) and for this purpose there is provided a logic unit 180 containing two bistables 181, 182 and a double-input gate 183. One input to the gate 183 is from the odd 1 line 111 via an inverter 184. The other input is from bistable 181. The bistable 181 is set by an odd 0 on line 113 to provide the second input for the gate 183. The other bistable 182 in the end of odd block indicator 180 is thus set to provide an output on receipt of an odd 0 followed by an odd 1, this output being applied to an even register and check circuit reset line 185. The bistables 181, 182 also provide a signal for further gates 186 and 187. Gate 186, unless it receives the correct signal from unit 180 (indicating the correct reception of the interblock indicator) will not provide an output to an inverter 188 and the output from this inverter will block gates 141–148. Gate 186 is a triple-input gate and its further inputs will be discussed later. Gate 187, which is also a triple-input gate, if it does not receive the correct inputs, sets an error bistable 189. This bistable is set if an overflow of data should occur which is not consistent with the end of block indicator signals. Setting of the error bistable 189 into the error condition will occur after an odd character block if, at the end of the character, an odd 1 were to appear before an odd 0, or, if after an odd 0, an even bit should occur. The first of these conditions is detected by applying the signals on the odd 1 input line 111 via an inverter 190 into the aforementioned gate 187. The third input to this gate is from the last stage of the register 115 showing that this stage has been set. Absence of the correct inputs to gate 187 puts the error bistable 189 in the error condition. It was previously mentioned that the error bistable 189 is set if, after an odd 0, an even bit should occur. The even bit comes from even bit error bistable 192. This bistable is reset by the end of even block indicator logic at the start of an odd character and is set at the end of the odd character by the odd 0 showing the interblock indicator is started. The bistable 192 in effect staticizes the first zero in the interblock indicator. To achieve this a signal showing the filling of the odd character register 115 applied to a gate 193 which also requires the presence of an odd 0 by having a second input, via an inverter 194, from the odd 0 line 113. Hence the even bit error bistable provides an output, to a double-input gate 195, at the end of an odd character and in the presence of an odd 0. The second input to gate 195 represents the absence of an even character, detected by an OR gate 196 fed from the even 1 and even 0 lines 110 and 112. Should an even bit on line 110 or 112 appear, which would be an error, then the signal applied to gate 195 via gate 196 sets the error bistable 189. Failure to receive either of the two correct inputs at gate 195 sets the error bistable 189 to the error condition. Setting the error bistable to the error condition feeds a signal via an inverter 197 to a double-input gate 198 and thence via an OR gate 199 to an error signal output line 200 indicating an error. In a teleprinter system, this signal may be used to type a star in place of a character. The setting of the error bistable in this way on detection of an error also results in this error bistable not providing an input to the aforementioned triple-input gate 186. This receives a further signal showing that the last stage of the register has been filled and, as previously described, a signal from the bistable in the end of block indicator 180. Absence of any one input to this triple-input gate 186 results in failure to provide an output via the inverter 188 which is necessary to open the aforementioned gates 141 to 148. An output from the bistable 182 in the end of odd block indicator 180 is fed on the line 185 to the logic at the end of the even character register to reset the error bistable and the odd bit error bistable in that logic. Likewise a corresponding output on a line 202 from an end of even block indicator 204 at the end of the even character register 116 is applied to reset the even bit error bistable 192 and the error bistable 189 in the logic at the end of the odd character register and is also used to reset the odd character register 115 when the end of block signal is obtained at the end of an even character.

It will be seen that, after the end of block indicator 180 has been set correctly, the next signal, assuming an odd character has just been received, will be an even bit. Prior to the receipt of this even bit, and during the period when the end of block indicator 180 for the odd character register was still set, the even register 116 is forced into the empty condition by the even register and check circuit reset line 185 and an error bistable 203 for the even character (corresponding to error bistable 289 for the odd character) is reset. Upon receiving the first bit of the even character, the end of odd character indicator 180 is then reset by a signal from OR gate 196 and the even register reset line 185 will have the reset signal removed thereby allowing the even set character register 116 to staticize the new incoming information.

The end of character logic at the end of the even character register is similar to that at the end of the odd character register 115 and will not therefore be further described in detail. It likewise inhibits the feeding of the information from the even character register 116 to the output data lines 161–118 unless the correct interblock indicator, in this case an even 0 followed by an even 1, is detected.

I claim:

1. A transmission system for transmission of binary digital data in blocks in serial form comprising four transmission channels for the separate transmission of information and means for separating and feeding the successive digits of the information to be transmitted into the four channels so that odd digits are fed into one or other of one pair of channels according as the digit is to be a '0' or '1' and even digits are fed into one or other of the other pair of channels according as to whether that digit is a '0' or '1' in combination with means for transmitting, between the end of one block of bits and the beginning of the next block, signals on two channels of either the first pair or the second pair to form an interblock indicator, the particular pair of channels used for the indicator being a pair not including the channel used for the last bit of the preceding block and the next succeeding block starting with a bit on one or other of a pair of channels not the same as that used for the indicator immediately preceding this bit.

2. A transmission system as claimed in claim 1 wherein the indicator comprises transmissions on two channels only in succession.

3. A transmission system as claimed in claim 2 wherein said means for separating and feeding the successive digits of each block into the four channels is arranged to provide a constant number of digits for each character.

4. A transmission system as claimed in claim 3 wherein said means for separating and feeding successive digits of each block of information to be transmitted into the four channels is arranged to provide an even number of bits in each block whereby, if the interblock indicator after one block is represented by transmissions on the first and second channels, the interblock indicator after the next block will be transmissions on the third and fourth channels.

5. A transmission system as claimed in claim 3 wherein said means for separating and feeding successive digits of each block of information to be transmitted into the four channels is arranged to provide an odd number of bits in each block and wherein, if the interblock indicator after one block is formed by a transmission on the first channel followed by a transmission on the second channel the interblock indicator after the next block is a transmission on the second channel followed by a transmission on the first channel.

6. A transmission system as claimed in claim 4 wherein there is provided a register to hold the bits for each block to be transmitted, a pulse generator to provide a succession of output pulses controlled by a clock, gating means controlled by the output pulses from the pulse generator to feed the successive pulses from said register alternately onto two leads, and two sets of output control circuits, controlled by a bistable so that one or other set is operative to feed the pulses from said first lead onto one or other of said first or second channels according as the signal is a '0' or '1' and signals on said second lead to one or other of the third or fourth channels according as the signal is a '0' or '1', the other set of output control circuits being arranged to feed signals on said first lead to one or other of said third and fourth channels according as to whether the signal is a '0' or '1' and from said second lead to said first and second output channels according to whether the signal is a '0' or '1', said bistable being controlled by said pulse generator to be switched at the end of each scanning sequence and wherein said pulse generator, between the signals for successive blocks provides two further signals forming the interblock indicator.

7. A transmission system as claimed in claim 6 wherein said pulse generator provides one of said interblock indicator signals at the start of the scanning sequence and the other at the end of the scanning sequence.

8. A receiver for a transmission system as claimed in claim 1 wherein there are provided means for receiving signals on the four channels, a register capable of receiving all the bits of a block, a detector for detecting the interblock indicator which detector provides an output initiating the feeding of the following bits into said register, and means responsive to the reception of the next interblock indicator for feeding the information out from the register to an output line or lines.

9. A receiver as claimed in claim 8 wherein, for staticizing a block, there is provided a register and switching circuits through which the signals of the four channels are fed from said receiving means, said switching circuits switching said register alternately from one pair of channels to the other pair of channels as each successive bit is received.

10. A receiver for use with a transmission system as claimed in claim 3 comprising means for receiving signals on the four channels output lines, two registers each capable of receiving all the bits of a block, two detectors for detecting the two interblock indicators respectively, which detectors provide respective output signals, and, for each interblock detector, gate means responsive to the output signal from that detector feeding to said output lines information from the register in which the preceding block was staticized, and resetting means responsive to the output signal from that detector for resetting the second register to zero.

11. A receiver as claimed in claim 10 wherein the two registers are arranged in a ring so that the first block gets staticized in the first register, the second in the second register, the third in the first register and so on.

12. A receiver as claimed in claim 10 wherein a checking logic system is provided to check each register for completeness before information is read out from it.

13. A receiver as claimed in claim 10 wherein there is provided error checking logic to check that, after one register has been filled, a signal is received on a specific one of the first or second channels and is followed by a signal on the other one of these channels and not by a signal on any other channel and wherein checking logic is provided to check that when the other register is filled, a signal is received on a predetermined one of said third or fourth channels and is followed by a signal on the other one of these two channels and not by a signal on any other channel.

14. A transmission system for transmission of binary digital data in serial form comprising a data source, four transmission channels for the separate transmission of information, means coupled to said data source for separating and feeding the successive digits of the information to be transmitted in blocks into the four channels so that odd digits are fed into one or other of one pair of channels according as the digit is to be a '0' or '1' and even digits are fed into one or other of the other pair of channels according as to whether that digit is a '0' or '1,' each block having a constant number of bits, means for transmitting, between the end of one block of bits and the beginning of the next block, signals on two channels of either the first pair or the second pair to form an interblock indicator, the particular pair of channels used for the indicator being a pair not including the channel used for the last bit of the preceding block and the next succeeding block starting with a bit on one or other of a pair of channels not the same as that used for the indicator immediately preceding this bit, alternate interblock indicators being different, in combination with a receiver for receiving and reporting the information transmitted on said four channels, first and second registers for staticizing blocks of received information, a plurality of output lines, first and second interblock detectors providing output signals responsive respectively to the two different interblock indicators, gate means responsive to the output signal from said first interblock detector feeding signals from said first register to said output lines and gate means responsive to the output signal from said second interblock detector feeding signals from said second register to said output lines.

15. A transmission system as claimed in claim 14 wherein there are provided first resetting means responsive to the output signal from the first detector which first resetting means reset said second register to zero and second resetting means responsive to the output signal from the second detector, which second resetting means reset said first register to zero.

16. A transmission system as claimed in claim 14 wherein each interblock detector includes error checking logic providing an error signal and inhibiting said output signal if, after the appropriate register is filled, any signal is received before the completion of the two bits of the appropriate interblock indicator.

17. A transmission system for transmission, from a transmitting station to a receiving station, of binary digital data in serial form, said data comprising successive characters, each character being of a predetermined constant number of bits wherein means are provided at said transmitting station for transmitting interblock indicators after each character, said interblock indicators being alternately of different distinctive form, comprising at least two binary bits, and wherein, at the receiving station, there are provided means for receiving the transmitted data, two registers for staticizing alternately received characters, a set of output lines, and two interblock indicator detectors responsive respectively to the two distinctive interblock indicators, and providing output signals, and two set of gate means coupling said two registers respectively to said output lines, said gate means being responsive to the output signals of the respective interblock indicator detectors to be opened only by the appropriate interblock indicator.

* * * * *